(12) United States Patent
Ginter et al.

(10) Patent No.: US 12,523,346 B2
(45) Date of Patent: Jan. 13, 2026

(54) SYSTEM AND METHOD FOR TRANSPORTATION OF CAPTURED CARBON

(71) Applicant: Caterpillar Inc., Peoria, IL (US)

(72) Inventors: David Ginter, Peoria, IL (US); Eric Fierson, Houston, TX (US)

(73) Assignee: Caterpillar Inc., Peoria, IL (US)

( * ) Notice: Subject to any disclaimer, the term of this patent is extended or adjusted under 35 U.S.C. 154(b) by 413 days.

(21) Appl. No.: 18/202,600

(22) Filed: May 26, 2023

(65) Prior Publication Data
US 2024/0392928 A1  Nov. 28, 2024

(51) Int. Cl.
*F17D 3/12* (2006.01)
*B01D 53/02* (2006.01)
*B01D 53/14* (2006.01)
*B01F 23/10* (2022.01)
*B01F 35/22* (2022.01)
*B01F 35/221* (2022.01)
*F17D 1/07* (2006.01)

(52) U.S. Cl.
CPC .............. *F17D 3/12* (2013.01); *B01D 53/02* (2013.01); *B01D 53/14* (2013.01); *B01F 23/10* (2022.01); *B01F 35/2202* (2022.01); *B01F 35/2211* (2022.01); *F17D 1/07* (2013.01); *B01D 2257/504* (2013.01); *B01D 2258/018* (2013.01); *Y02T 10/30* (2013.01)

(58) Field of Classification Search
CPC .... F17D 3/12; F17D 1/07; B01F 23/10; B01F 35/2211; B01F 35/2202; B01D 53/02; B01D 53/14; B01D 2257/504; B01D 2258/018; Y02T 10/30
USPC ................................... 137/3, 487.5
See application file for complete search history.

(56) References Cited

U.S. PATENT DOCUMENTS

| 5,888,470 | A  | * | 3/1999 | Engler .................... C01B 3/501 423/437.1 |
| 7,490,472 | B2 |   | 2/2009 | Lynghjem et al. |
| 8,920,548 | B2 |   | 12/2014 | Hokari et al. |
| 9,283,512 | B2 |   | 3/2016 | Carruthers et al. |
| 10,569,215 | B2 |   | 2/2020 | Reddy et al. |
| 11,484,827 | B2 |   | 11/2022 | Van der Walt et al. |
| 2003/0141058 | A1 | * | 7/2003 | Waal .................... F02B 43/00 166/268 |
| 2010/0251763 | A1 |   | 10/2010 | Audun |
| 2018/0299077 | A1 | * | 10/2018 | Isom ....................... F17D 1/04 |
| 2022/0134278 | A1 | * | 5/2022 | Umeda ............... B01D 53/326 204/278 |
| 2022/0387930 | A1 | * | 12/2022 | Iijima ................ B01D 53/0407 |
| 2023/0211287 | A1 | * | 7/2023 | Scherpbier ......... B01D 53/1475 |

(Continued)

*Primary Examiner* — Minh Q Le (57) ABSTRACT

The transportation of captured carbon from production sites to a destination at which it can be stored or used traditionally requires the carbon to be carried into a tanker truck for road transport, which is costly. Disclosed embodiments eliminate or reduce this cost by compressing the captured carbon into an existing natural gas pipeline. The existing network of pipelines can then be used to transport the captured carbon to a distant destination, while potentially picking up additional captured carbon along the way. In addition, a portion of the captured carbon at each production site may be redirected back to the engine of the compressor to enable higher power density and prevent knocking.

20 Claims, 6 Drawing Sheets

(56) References Cited

U.S. PATENT DOCUMENTS

| | | | |
|---|---|---|---|
| 2023/0264142 A1* | 8/2023 | Noguchi | B01D 53/30 |
| | | | 95/8 |
| 2023/0285890 A1* | 9/2023 | Ito | B01D 53/053 |
| 2023/0330588 A1* | 10/2023 | Takezaki | B01D 53/04 |
| 2024/0066461 A1* | 2/2024 | Kumar | B01D 53/00 |
| 2024/0100472 A1* | 3/2024 | Schmidt | C01B 3/48 |

* cited by examiner

SYSTEM AND METHOD FOR TRANSPORTATION OF CAPTURED CARBON

TECHNICAL FIELD

The embodiments described herein are generally directed to carbon capture, and, more particularly, to a system and method for transporting captured carbon with low capital and operational expenditures.

BACKGROUND

A combustion engine typically operates by igniting a mixture of fuel, such as natural gas and air, in a combustion chamber. The energy released during the combustion process is harnessed to power the engine and perform work. During the combustion process, methane (CH4) or other hydrocarbons in the fuel react with oxygen (O2) in the air to produce carbon dioxide (CO2) and water vapor (H2O) as byproducts. While water vapor is typically released into the atmosphere as a harmless gas, in some instances, it may be desirable to capture the carbon dioxide rather than release it to the atmosphere.

There are several ways to capture and dispose of CO2 emissions. One common method is to use carbon capture and storage (CCS) technology, which involves capturing CO2 emissions from the engine and storing them in underground geological formations. Another method is to convert carbon dioxide into other products, such as chemicals or fuels, through a process called carbon utilization.

However, the sites at which CO2 emissions are produced may be located far from the sites at which the captured CO2 emissions can be stored or converted. Thus, the captured carbon dioxide must be transported between sites. Typically, this transportation involves compressing the carbon dioxide into the tank of a truck for road transport. Such transportation represents a parasitic cost of carbon capture.

U.S. Pat. No. 11,484,827, issued on Nov. 1, 2022, discloses a system in which captured carbon dioxide is transported using an existing natural gas pipeline that extends from the site of production to a carbon sequestration site or other carbon user location. The present disclosure is directed toward overcoming one or more of the problems discovered by the inventors.

SUMMARY

In an embodiment, a system for transporting captured carbon in a natural gas pipeline comprises: a compressor positioned within a flow path of the natural gas pipeline; an engine that drives the compressor, wherein the engine is powered by fuel provided from the natural gas pipeline to the engine along a fuel path, mixed with air provided along an air path; and a carbon capture system that captures carbon from an exhaust of the engine, wherein the carbon capture system provides a first portion of the captured carbon to an inlet of the compressor, and provides a second portion of the captured carbon to an input path to the engine, wherein the input path comprises at least one of the fuel path or the air path.

In an embodiment, a system for transporting captured carbon in a natural gas pipeline comprises: a compressor positioned within a flow path of the natural gas pipeline; an engine that drives the compressor, wherein the engine is powered by fuel provided from the natural gas pipeline to the engine along a fuel path, mixed with air provided along an air path; a carbon capture system that captures carbon from an exhaust of the engine, wherein the carbon capture system provides a first portion of the captured carbon to an inlet of the compressor, and provides a second portion of the captured carbon to an input path to the engine, wherein the input path comprises at least one of the fuel path or the air path; a flow valve between the carbon capture system and the input path; a sensor that outputs an indication of the methane number of the fuel in the input path between the flow valve and the engine; and a controller configured to execute a control process in a feedback loop, wherein the control process comprises receiving the indication of the methane number from the sensor, receiving an engine load from the engine, calculating an amount of the second portion of the captured carbon to add to the input path to reach a target setpoint, based on the methane number and the engine load, and actuating the flow valve to add the calculated amount of the second portion of the captured carbon to the input path.

In an embodiment, a method comprises, by a controller, in a system that includes a compressor positioned within a flow path of a natural gas pipeline, an engine that drives the compressor, and a carbon capture system that captures carbon from an exhaust of the engine executing a control process comprising: receiving an indication of a methane number of fuel in a fuel path that supplies fuel from the natural gas pipeline to the engine; receiving an engine load from the engine; calculating an amount of captured carbon, from the carbon capture system, to add to an input path to the engine to reach a target setpoint, based on the methane number and the engine load; and actuating a flow valve between the carbon capture system and the input path to add the calculated amount of captured carbon to the input path.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description.

For clarity and ease of explanation, some details may be omitted in the present description and figures. It should also be understood that the various components illustrated herein are not necessarily drawn to scale. In other words, the features disclosed in various embodiments may be implemented using different relative dimensions within and between components than those illustrated in the drawings.

Figure 1A:
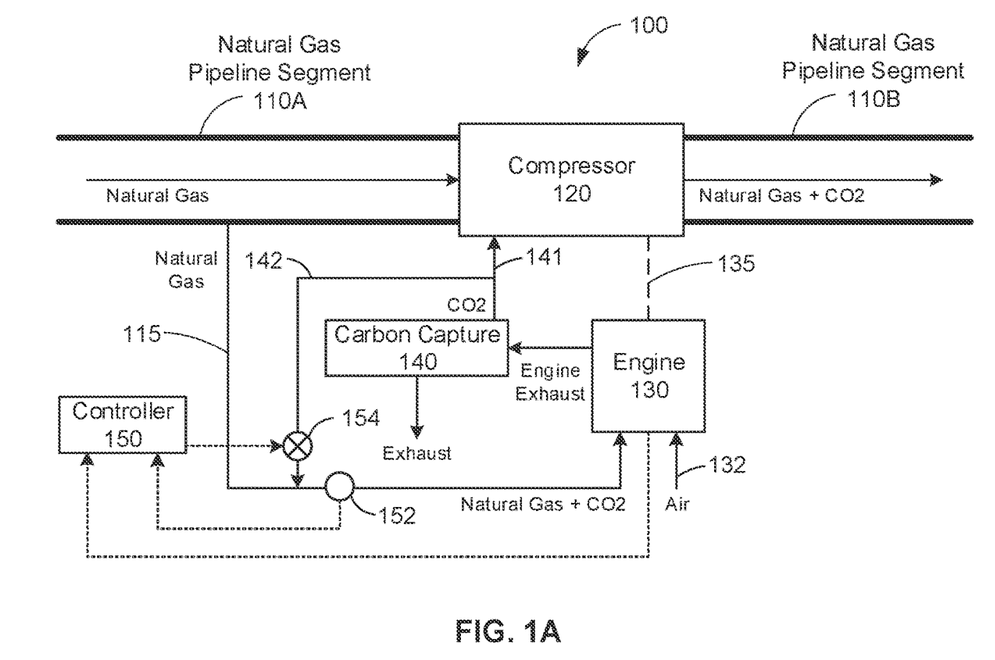
FIG. 1A illustrates a schematic diagram of a system for the transportation of captured carbon, according to a first embodiment.

FIG. 1A illustrates a schematic diagram of a system 100 for the transportation of captured carbon, according to a first embodiment. System 100 operates on a portion of a natural gas pipeline 110 that transports natural gas from a source to a destination. Natural gas pipeline 110 may comprise a plurality of segments, illustrated as segments 110A and 110B. As will be discussed herein, the natural gas in natural gas pipeline 110 may be mixed with carbon dioxide by system 100. Thus, the gas in natural gas pipeline 110 will be referred to herein as "fuel," which may comprise or consist of natural gas, or comprise or consist of a mixture of natural gas and carbon dioxide.

System 100 comprises a compressor 120. An inlet of compressor 120 is in fluid communication with a downstream end of first segment 110A of natural gas pipeline 110. An outlet of compressor 120 is in fluid communication with an upstream end of second segment 110B of natural gas pipeline 110. Compressor 120 compresses fuel flowing from first segment 110A into the inlet of compressor 120. The compressed fuel flows from the outlet of compressor 120 into second segment 110B. Compressor 120 may be any type or model of pipeline compressor, such as any of the Titan models, Mars models, Taurus models, Centaur models, or Saturn models of gas compressors, manufactured by Solar Turbines Incorporated of San Diego, California. Compressor 120 may comprise a plurality of stages, which each compresses the fuel flowing through compressor 120 to a higher pressure level.

System 100 comprises an engine 130 that drives compressor 120 via a shaft 135. Engine 130 is supplied with fuel from natural gas pipeline 110, which is mixed with air from an air path 132. For example, engine 130 may be supplied with fuel from first segment 110A of natural gas pipeline 110 along a fuel path 115. For example, if 75 Megawatts thermal (MWth) of fuel is flowing in first segment 110A, 2.5 MWth may be diverted to fuel path 115, while the remaining 72.5 MWth flow through compressor 120 to second segment 110B. When the fuel, which is primarily composed of methane (i.e., CH4), is burned by engine 130 in the presence of oxygen, the two elements combine to form water vapor (i.e., H2O) and carbon dioxide (i.e., CO2). The water vapor produced during this reaction is usually in the form of steam, which is released into the atmosphere. The carbon dioxide is expelled in the exhaust of engine 130.

System 100 comprises a carbon capture system 140 that captures carbon from the exhaust of engine 130. Carbon capture system 140 may utilize any suitable carbon capture technology, including, without limitation, a membrane, oxyfuel combustion, absorption, adsorption, chemical looping combustion, calcium loop, cryogenic, or the like. In an example implementation, carbon capture system 140 may remove water from the exhaust, capture carbon dioxide using a sorbent material, while allowing the remaining nitrogen and oxygen to leave system 100 as exhaust, and then desorb the carbon dioxide from the sorbent material using heat and pumping to generate a pure stream of captured carbon dioxide out of carbon capture system 140. Typically, about 90% to 95% of the carbon dioxide in the exhaust of engine 130 can be captured.

Carbon capture system 140 may direct a first portion of the captured carbon dioxide to compressor 120 along a first flow path 141. Compressor 120 compresses this first portion of captured carbon dioxide, with the fuel in first segment 110A, into second segment 110B of natural gas pipeline 110. Compressor 120 may ingest the captured carbon dioxide from first flow path 141 into natural gas pipeline 110 at the suction of compressor 120, which may be a reciprocating pipeline compressor. In particular, specifically timed valves may ingest the carbon dioxide (e.g., which may be less than 1 pound per square inch gauge (psig), prior to the fuel in first segment 110A being boosted (e.g., 20-50 psig), on the intake stroke of the piston. The amount of captured carbon dioxide in the first portion may add between 2% to 6%—and preferably about 3% to 5%—by volume of carbon dioxide to the fuel in first segment 110A, such that the fuel flowing downstream in second segment 110A comprises 2% to 6%—and preferably about 3% to 5%—by volume of carbon dioxide. It should be understood that these are just exemplary ranges, and that the actual amount of captured carbon dioxide that is added may depend on the particular design objectives, including the capabilities of engine 130.

In addition, carbon capture system 140 may direct a second portion of the captured carbon dioxide back to fuel path 115, along a second flow path 142, where it is mixed with the fuel from first segment 110A of natural gas pipeline 100. Thus, prior to reaching engine 130, the fuel from natural gas pipeline 110 may be mixed with carbon dioxide output by carbon capture system 140. Adding carbon dioxide to the fuel for engine 130 may enable engine 130 to operate with higher power and without knocking. Knocking occurs when the carbon-gas-air mixture ignites prematurely in engine 130, which may damage engine 130.

System 100 comprises a controller 150 that controls the flow of fuel from natural gas pipeline 110 to engine 130. Controller 150 may receive the output of a sensor 152 that measures the methane number of fuel flowing into engine 130. This methane number may be used as an input in a process to control a flow valve 154. Flow valve 154 controls how much carbon dioxide in second flow path 142 from carbon capture system 140 is mixed with the natural gas flowing from natural gas pipeline 110 to engine 130 along fuel path 115.

In order to prevent knocking in engine 130, controller 150 may utilize a feedback loop to optimize the mixture of natural gas and carbon dioxide being supplied as fuel to engine 130. In particular, controller 150 may continuously or continually adjust flow valve 154 to precisely control the amount of carbon dioxide being mixed with fuel in fuel path 115. For example, controller 150 may process the output of sensor 152 to determine the amount of carbon dioxide that should be mixed into the fuel flowing from natural gas pipeline 110 to engine 130 along fuel path 115. Based on the output of sensor 152, controller 150 may output a control signal to flow valve 154, thereby actuating flow valve 154 into a configuration that enables the determined amount of carbon dioxide to flow into fuel path 115, and mix with the fuel in fuel path 115 prior to reaching engine 130.

Engine 130 may be uprated by about 25%, which can be enabled by operating on fuel with a high methane number (e.g., a methane number of 110). The high methane number may be achieved by mixing an appropriate amount of carbon dioxide with the natural gas in the fuel supplied to engine 130.

Figure 1B:
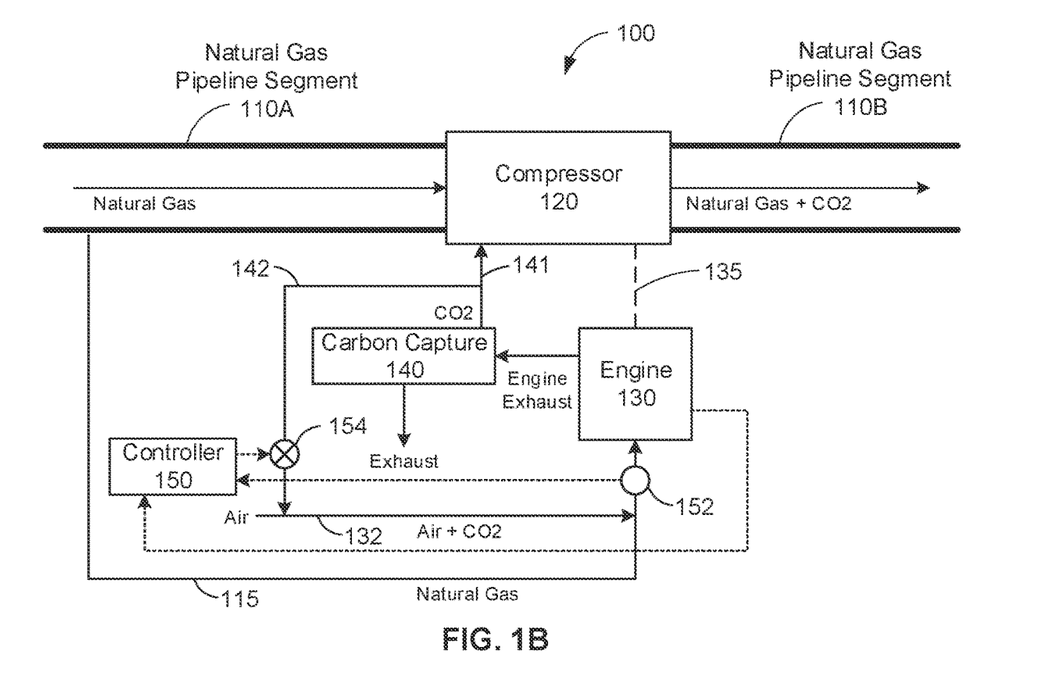
FIG. 1B illustrates a schematic diagram of a system for the transportation of captured carbon, according to a second embodiment.

FIG. 1B illustrates a schematic diagram of a system 100 for the transportation of captured carbon, according to a second embodiment. This second embodiment differs from the first embodiment in that carbon dioxide in second flow path 142 from carbon capture system 140 is mixed with air in air path 132, instead of natural gas in fuel path 115. Thus, flow valve 154 is positioned between second flow path 142 and air path 132, and sensor 152 is provided between the confluence of air path 132 with fuel path 115 and the inlet of engine 130. Controller 150 may receive the output of sensor 152 that measures the methane number of fuel flowing into engine 130. This methane number may be used as an input in a process to control flow valve 154. Flow valve 154 controls how much carbon dioxide in second flow path 142 from carbon capture system 140 is mixed with the air flowing from air path 132 to engine 130 along fuel path 115.

In all other respects, the second embodiment may be identical to the first embodiment. Thus, any description of the other components with respect to the first embodiment may be equally applied to the other components of the second embodiment, and therefore, these components will not be redundantly described herein.

In addition, it should be understood that the first and second embodiments are not mutually exclusive. For example, second flow path 142 could be in fluid communication with both fuel path 115 and air path 132, via respective flow valves 154, such that carbon dioxide may be added to both fuel path 115 and air path 132 under the control of controller 150. Thus, the term "input path" may be used herein to refer to either one or both of fuel path 115 and air path 132, which collectively, provide natural gas, carbon dioxide, and air to engine 130.

Figure 2:
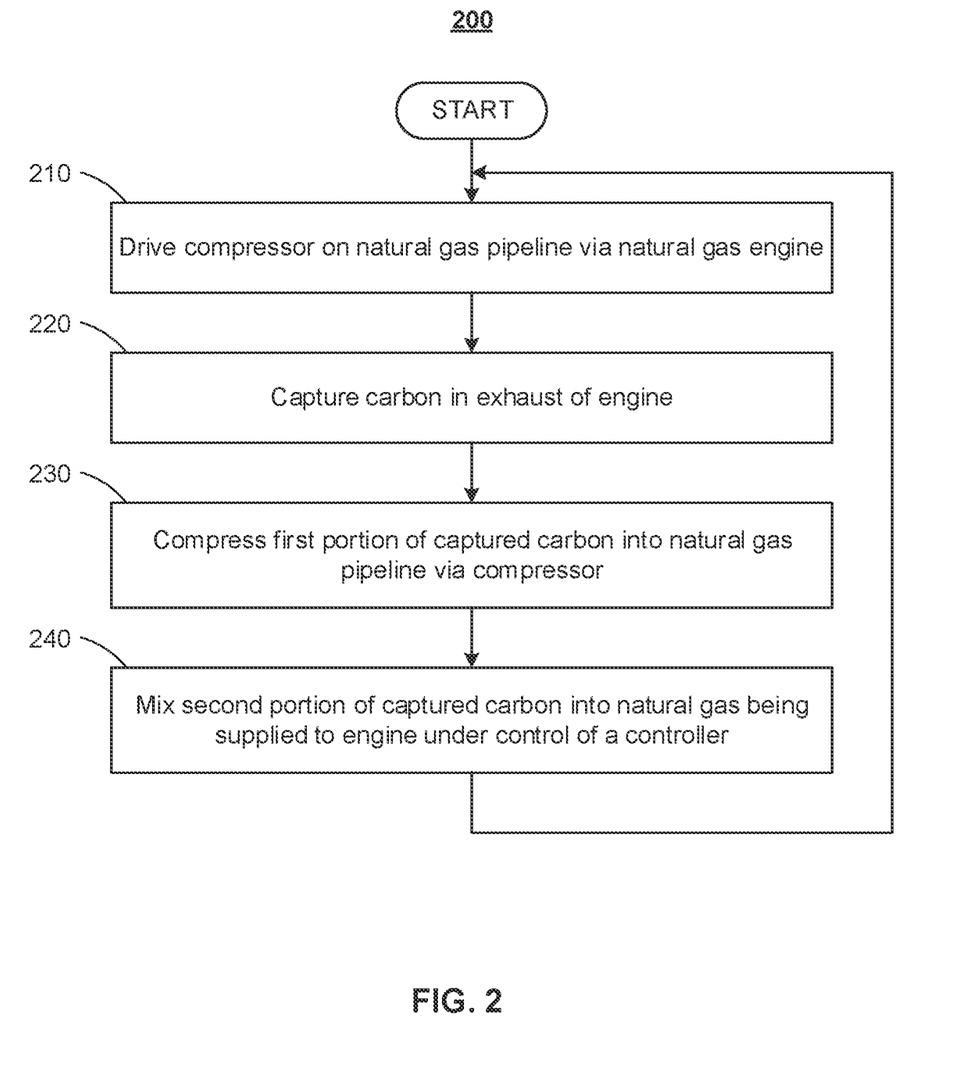
FIG. 2 illustrates a process for transporting captured carbon, according to an embodiment.

FIG. 2 illustrates a process 200 for transporting captured carbon, according to an embodiment. Process 200 may be implemented in system 100 to incorporate captured carbon into natural gas pipeline 110 for transportation to a distant location that is closer to a final destination for the captured carbon. Process 200 may be executed continuously for as long as engine 130 is operating.

In subprocess 210, compressor 120 is driven on natural gas pipeline 110 via shaft 135 of engine 130, which is powered by a mixture of air from the external environment and fuel from natural gas pipeline 110, which may be mixed with carbon dioxide from carbon capture system 140 via flow valve 154. It should be understood that, in the event that foreign system 405 exists upstream the fuel in first segment 110A may already comprise a mixture of natural gas and carbon dioxide. Otherwise, the fuel in first segment 110A may comprise natural gas without carbon dioxide or may consist of natural gas.

During subprocess 210, the fuel undergoes a combustion process inside engine 130 where it reacts with oxygen to produce heat, water vapor, and carbon dioxide. The exhaust of engine 130 is designed to transport these byproducts from the combustion process. As discussed above, the exhaust flows to carbon capture system 140.

In subprocess 220, carbon capture system 140 captures carbon from the exhaust of engine 130. In particular, carbon capture system 140 may separate carbon dioxide from other gases in the exhaust of engine 130. The output of carbon capture system 140 may branch into first flow path 141 and second flow path 142.

In subprocess 230, a first portion of the carbon captured by carbon capture system 140 is provided to compressor 120 along first flow path 141 to be compressed into natural gas pipeline 110. Compressor 120 may decrease the volume of the first portion of carbon dioxide, while increasing the pressure of the first portion of carbon dioxide, and mix the first portion of carbon dioxide into the fuel flowing through natural gas pipeline 110. This allows the carbon dioxide to be efficiently transported downstream through an existing natural gas pipeline 110, without the need for road transport or a separate dedicated pipeline.

In subprocess 240, a second portion of the carbon captured by carbon capture system 140 is mixed into the fuel being supplied to engine 130 along fuel path 115 and/or into the air being supplied to engine 130 along air input 132, under the control of controller 150. Controller 150 can process the output of sensor 152, which may measure the methane number of the fuel flowing into engine 130. Controller 150 may control flow valve 154, in a feedback loop, to drive the methane number, output by sensor 152, towards a target setpoint.

Figure 3:
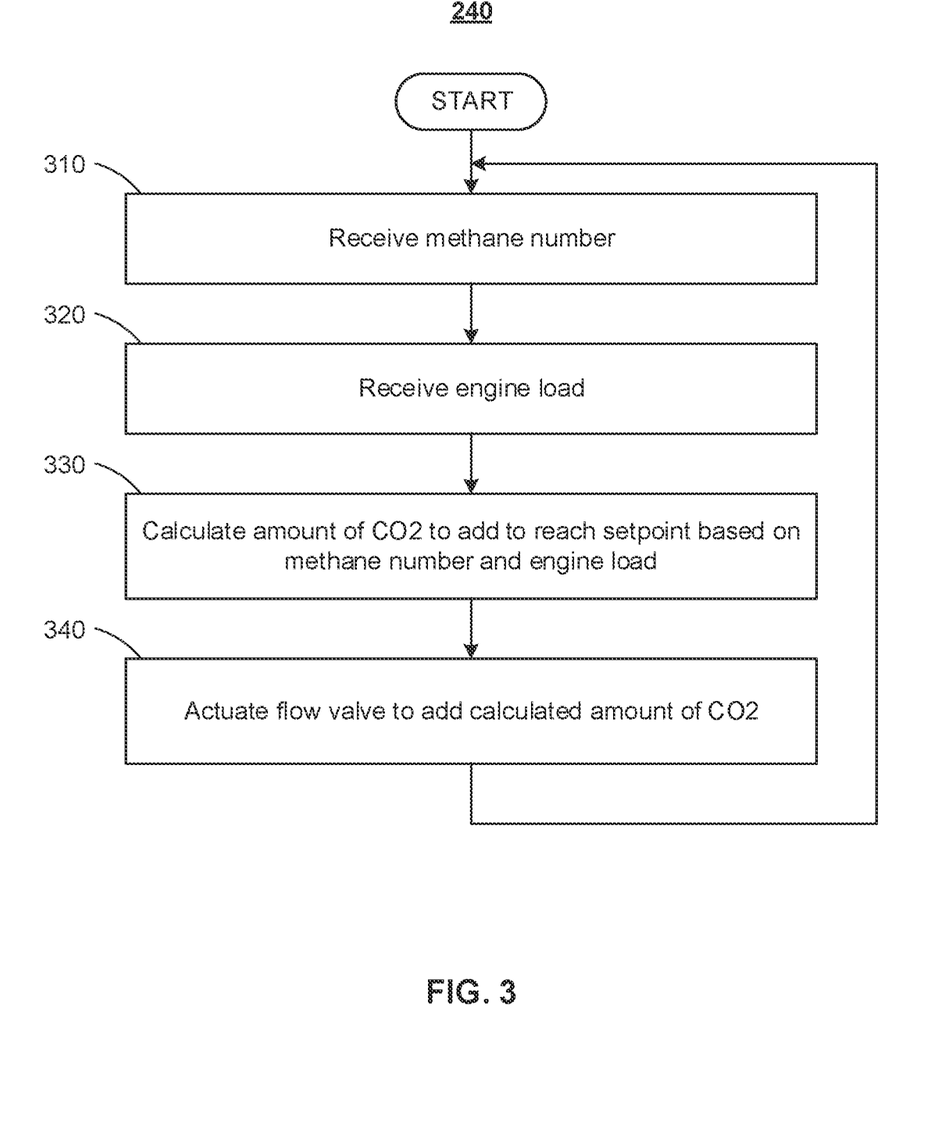
FIG. 3 illustrates a control process for regulating a mixture of natural gas and carbon dioxide used by an engine from which carbon is captured, according to an embodiment.

FIG. 3 illustrates an example of subprocess 240 in process 200, according to an embodiment. Subprocess 240 may be executed by controller 150, and may be implemented in software, hardware, or a combination of software and hardware. As described above, subprocess 240 represents a control process for regulating a mixture of natural gas and carbon dioxide in the fuel being supplied to engine 130, from which carbon dioxide is being captured by carbon capture system 140.

In subprocess 310, controller 150 receives the methane number of the fuel being supplied to engine 130 from sensor 152. The methane number is a measure of the resistance of fuel to detonation when it is burned in engine 130, and is a product of the constituent gases of the fuel. A higher methane number indicates a better resistance to knocking in engine 130.

In subprocess 320, controller 150 receives the engine load on engine 130 from engine 130. The engine load may be measured by a sensor (e.g., mass air flow sensor) in engine 130. Controller 150 may be communicatively coupled to this sensor, to receive the measure of engine load from this sensor in subprocess 320.

In subprocess 330, controller 150 calculates the amount of carbon dioxide that must be added to the fuel being supplied to engine 130 to reach a target setpoint, based on the methane number, received in subprocess 310, and the engine load, received in subprocess 320. The value of the target setpoint may be stored in a memory of controller 150, such that it can be retrieved for the calculation in subprocess 330, or may be determined dynamically according to a suitable algorithm for engine 130 as a function of the methane number and/or the engine load. The target setpoint may be a target methane number.

In subprocess 340, controller 150 actuates flow valve 154 to add the amount of carbon dioxide, calculated in subprocess 330, to the fuel and/or air being supplied to engine 130. In particular, controller 150 may be communicatively coupled to flow valve 154, and may transmit a control signal to flow valve 154 to actuate flow valve 154 into a configuration that enables the calculated amount of carbon dioxide to flow into fuel path 115 and/or air input 132.

Subprocess 240 may utilize a feedback loop. For example, the measured methane number may be continuously or continually compared to the target setpoint, which may be a target methane number. In this case, the amount of carbon dioxide that is added to the fuel may be continuously or continually adjusted based on this comparison, until the measured methane number is within a tolerance of the target setpoint or to maintain the measured methane number within the tolerance of the target setpoint.

Figure 4:
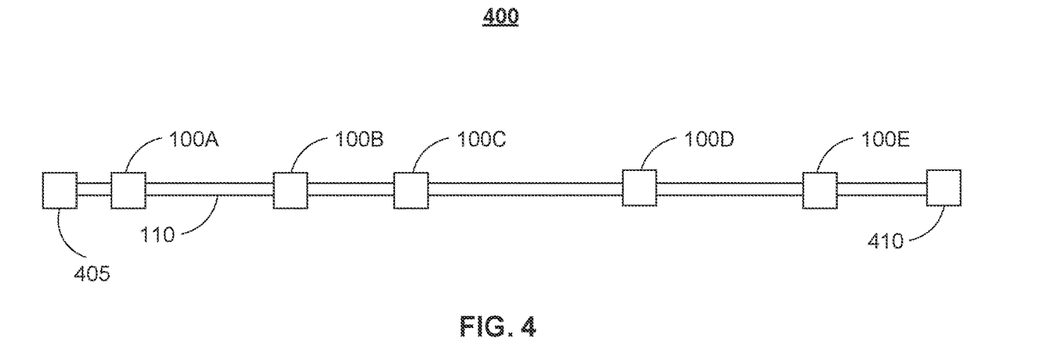
FIG. 4 illustrates a network of systems for transporting captured carbon, according to an embodiment.

FIG. 4 illustrates a network 400 of systems 100 for transporting captured carbon, according to an embodiment. As illustrated, a plurality of systems 100, illustrated as systems 100A, 100B, 100C, 100D, and 100E, may be installed along natural gas pipeline 110. Each system 100 may mix a portion of carbon dioxide into the fuel flowing through natural gas pipeline 110, as discussed above. In some instances, an upstream system 405 may exist upstream, which may be an initial source of captured carbon, such that the fuel in natural gas pipeline 110 may already comprise a mixture of natural gas and carbon dioxide when arriving at system 100A. Thereafter, the fuel flows from the first system 100A, picking up a portion of captured carbon from each system 100, and transports the composite fuel to a destination 410. Thus, network 400 acts as a train to transport carbon dioxide from a plurality of systems 100 to destination 410.

First system 100A may be an inlet responsible for receiving the natural gas from a source and introducing it into network 400. Alternatively, first system 100A may be downstream from one or more other components of network 400, such as upstream system 405, that introduce the natural gas into network 400. Destination 410 may be a carbon storage or conversion site, which may be in a major usage center (e.g., near a large city). Destination 410 may comprise a natural gas genset with a high power density and high efficiency engine, having excellent carbon capture efficiency, to extract the carbon dioxide from the fuel in natural gas pipeline 110. The extracted carbon dioxide may then be delivered to a user near destination 410.

Collectively, the plurality of systems 100 may add an amount of captured carbon dioxide that is less than 20% by volume of the fuel in natural gas pipeline 110, and preferably less than 12% by volume of the fuel in natural gas pipeline 110. The particular maximum threshold for the collective percentage by volume of carbon dioxide in the fuel in natural gas pipeline 110 may be set based on the limit(s) of engines 130 and/or other engines utilizing the fuel in natural gas pipeline 110.

Figure 5:
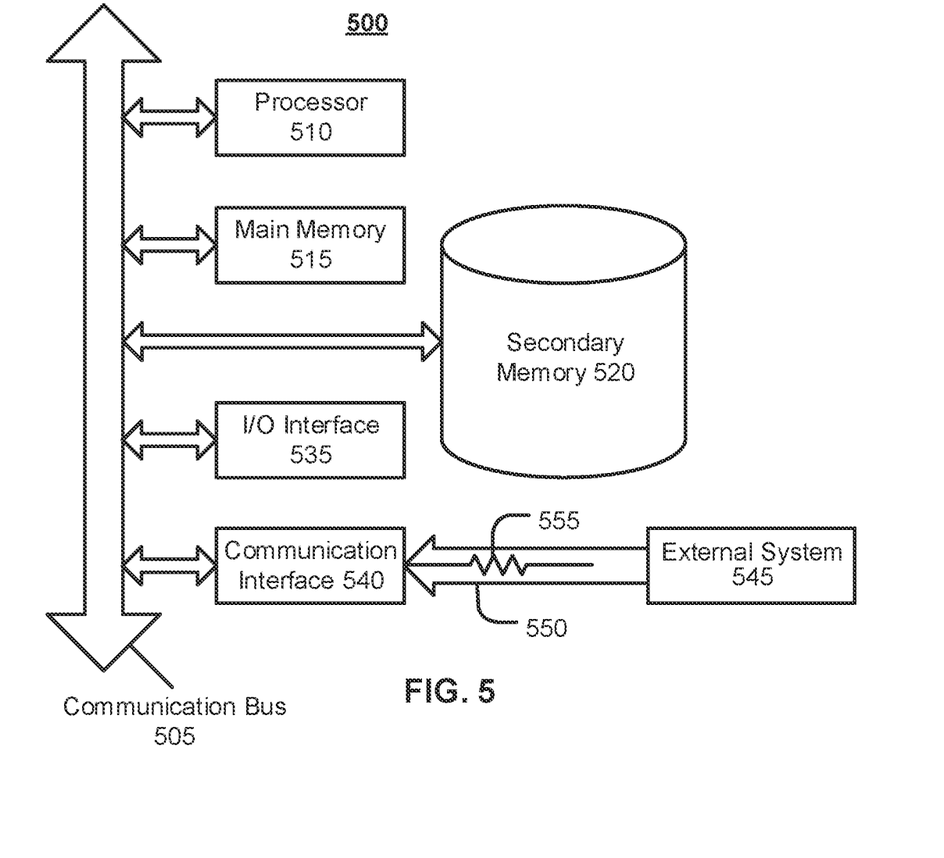
FIG. 5 illustrates a processing system that may be used to implement processes described herein, according to an embodiment.

FIG. 5 illustrates an example processing system 500 that may be used as controller 150. System 500 may comprise one or more processors 510. Processor(s) 510 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a subordinate processor (e.g., back-end processor), an additional microprocessor or controller for dual or multiple processor systems, and/or a coprocessor. Such auxiliary processors may be discrete processors or may be integrated with a main processor 510. Examples of processors which may be used with system 500 include, without limitation, any of the processors (e.g., Pentium™, Core 7™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor 510 may be connected to a communication bus 505. Communication bus 505 may include a data channel for facilitating information transfer between storage and other peripheral components of system 500. Furthermore, communication bus 505 may provide a set of signals used for communication with processor 510, including a data bus, address bus, and/or control bus (not shown). Communication bus 505 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 500 may comprise main memory 515. Main memory 515 provides storage of instructions and data for programs executing on processor 510, such as one or more of the functions (e.g., subprocess 240) and/or modules discussed herein. It should be understood that programs stored in the memory and executed by processor 510 may be written and/or compiled according to any suitable language, including without limitation C/C++, Java, JavaScript, Perl, Python, Visual Basic, .NET, and the like. Main memory 515 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

System 500 may comprise secondary memory 520. Secondary memory 520 is a non-transitory computer-readable medium having computer-executable code and/or other data (e.g., any of the software disclosed herein) stored thereon. In this description, the term "computer-readable medium" is used to refer to any non-transitory computer-readable storage media used to provide computer-executable code and/or other data to or within system 500. The computer software stored on secondary memory 520 is read into main memory 515 for execution by processor 510. Secondary memory 520 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

System 500 may comprise an input/output (I/O) interface 535. I/O interface 535 provides an interface between one or more components of system 500 and one or more input and/or output devices. For example, sensor 152 may be connected to I/O interface 535 as an input, and flow valve 154 may be connected to I/O interface 535 as an output.

System 500 may comprise a communication interface 540. Communication interface 540 allows software to be transferred between system 500 and external devices (e.g., sensor 152 and/or flow valve 154), networks, or other information sources. For example, computer-executable code and/or data may be transferred to system 500, over one or more networks, from a network server via communication interface 540. Examples of communication interface 540 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 500 with a network or another computing device. Communication interface 540 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software transferred via communication interface 540 is generally in the form of electrical communication signals 555. These signals 555 may be provided to communication interface 540 via a communication channel 550 between communication interface 540 and an external system 545. In an embodiment, communication channel 550 may be a wired or wireless network, or any variety of other communication links. Communication channel 550 carries signals 555 and can be implemented using a variety of wired or wireless communication means including wire or cable, fiber optics, conventional phone line, cellular phone link, wireless data communication link, radio frequency ("RF") link, or infrared link, just to name a few.

Computer-executable code is stored in main memory 515 and/or secondary memory 120. Computer-executable code can also be received from an external system 545 via communication interface 540 and stored in main memory 515 and/or secondary memory 520. Such computer-executable code, when executed by processor(s) 510, enable system 500 to perform the various functions (e.g., subprocess 240) of the disclosed embodiments as described elsewhere herein.

INDUSTRIAL APPLICABILITY

Transporting captured carbon from production sites to storage or usage sites, using traditional methods, is costly. Embodiments of system 100 eliminate or reduce this cost by enabling carbon, captured by carbon capture system 140, to be incorporated into the natural gas of an existing natural gas pipeline 110. The captured carbon can flow downstream through network 400 of natural gas pipeline 110, and be extracted at destination 410, which may be far from the production site of the captured carbon. These embodiments require lower capital and operational expenditures, per unit of carbon dioxide transported, than alternative solutions, such as road transport or constructing a new dedicated pipeline for the captured carbon. In addition, a portion of the carbon, captured by carbon capture system 140, can be redirected to the fuel supplied to engine 130, under the control of controller 150, to enable higher power density in engine 130 and prevent knocking. In many cases, system(s) 100 may be constructed by retrofitting existing engines 130, to further reduce the capital cost.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of pipeline. Hence, although the present embodiments are, for convenience of explanation, depicted and described as being implemented in a natural gas pipeline, it will be appreciated that it can be implemented in various other types of pipelines that may transport captured carbon, and in various other systems and environments. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

What is claimed is:

1. A system for transporting captured carbon in a natural gas pipeline, the system comprising:
    a compressor positioned within a flow path of the natural gas pipeline;
    an engine that drives the compressor, wherein the engine is powered by fuel provided from the natural gas pipeline to the engine along a fuel path, mixed with air provided along an air path; and
    a carbon capture system that captures carbon from an exhaust of the engine, wherein the carbon capture system provides a first portion of the captured carbon to an inlet of the compressor, and provides a second portion of the captured carbon to an input path to the engine, wherein the input path comprises at least one of the fuel path or the air path.

2. The system of claim 1, further comprising a controller configured to control an amount of the second portion of the captured carbon that is provided to the input path.

3. The system of claim 2, further comprising a flow valve between the carbon capture system and the input path, and wherein the controller is configured to control the amount of the second portion of the captured carbon by controlling the flow valve.

4. The system of claim 3, further comprising a sensor that outputs an indication of a methane number of the fuel in the fuel path, wherein the controller is configured to determine the amount of the second portion of the captured carbon to be provided to the input path based on the indication of the methane number.

5. The system of claim 4, wherein the controller is configured to execute a control process comprising:
    receiving the indication of the methane number from the sensor;
    receiving an engine load from the engine;
    calculating the amount of the second portion of the captured carbon to add to the input path to reach a target setpoint, based on the methane number and the engine load; and
    actuating the flow valve to add the calculated amount of the second portion of the captured carbon to the input path.

6. The system of claim 5, wherein the methane number is of the fuel in the input path between the flow valve and the engine, and wherein the control process is performed as a feedback loop to continuously or continually adjust the amount of the second portion of the captured carbon that is added to the input path.

7. The system of claim 1, wherein, at an outlet of the compressor, an amount of the first portion of the captured carbon is between 2% to 6% by volume of the fuel in the natural gas pipeline.

8. A network comprising:
the natural gas pipeline; and
at least one of the system of claim 1.

9. The network of claim 8, comprising:
a plurality of the systems; and
a destination site downstream from all of the plurality of the systems.

10. The network of claim 9, wherein each of the plurality of the systems adds an amount of captured carbon that is between 2% to 6% by volume of the fuel in the natural gas pipeline.

11. The network of claim 9, wherein, collectively, the plurality of the systems adds an amount of captured carbon that is less than 20% by volume of the fuel in the natural gas pipeline.

12. A system for transporting captured carbon in a natural gas pipeline, the system comprising:
a compressor positioned within a flow path of the natural gas pipeline;
an engine that drives the compressor, wherein the engine is powered by fuel provided from the natural gas pipeline to the engine along a fuel path, mixed with air provided along an air path;
a carbon capture system that captures carbon from an exhaust of the engine, wherein the carbon capture system provides a first portion of the captured carbon to an inlet of the compressor, and provides a second portion of the captured carbon to an input path to the engine, wherein the input path comprises at least one of the fuel path or the air path;
a flow valve between the carbon capture system and the input path;
a sensor that outputs an indication of the methane number of the fuel in the input path between the flow valve and the engine; and
a controller configured to execute a control process in a feedback loop, wherein the control process comprises
receiving the indication of the methane number from the sensor,
receiving an engine load from the engine,
calculating an amount of the second portion of the captured carbon to add to the input path to reach a target setpoint, based on the methane number and the engine load, and
actuating the flow valve to add the calculated amount of the second portion of the captured carbon to the input path.

13. The system of claim 12, wherein, at an outlet of the compressor, an amount of the first portion of the captured carbon is between 2% to 6% by volume of the fuel in the natural gas pipeline.

14. A network comprising:
the natural gas pipeline; and
at least one of the system of claim 12.

15. The network of claim 14, comprising:
a plurality of the systems; and
a destination site downstream from all of the plurality of the systems.

16. The network of claim 15, wherein each of the plurality of the systems adds an amount of captured carbon that is between 2% to 6% by volume of the fuel in the natural gas pipeline.

17. The network of claim 15, wherein, collectively, the plurality of the systems adds an amount of captured carbon that is less than 20% by volume of the fuel in the natural gas pipeline.

18. A method comprising, by a controller, in a system that includes a compressor positioned within a flow path of a natural gas pipeline, an engine that drives the compressor, and a carbon capture system that captures carbon from an exhaust of the engine executing a control process comprising:
receiving an indication of a methane number of fuel in a fuel path that supplies fuel from the natural gas pipeline to the engine;
receiving an engine load from the engine;
calculating an amount of captured carbon, from the carbon capture system, to add to an input path to the engine to reach a target setpoint, based on the methane number and the engine load; and
actuating a flow valve between the carbon capture system and the input path to add the calculated amount of captured carbon to the input path.

19. The method of claim 18, wherein the control process is performed as a feedback loop to continuously or continually adjust the amount of captured carbon that is added to the input path.

20. The method of claim 18, further comprising providing a portion of the captured carbon from the carbon capture system to an inlet of the compressor.

* * * * *